(12) United States Patent
Sanchez et al.

(10) Patent No.: US 10,850,654 B2
(45) Date of Patent: Dec. 1, 2020

(54) CUSHIONING FOR A SEATING OR BACKREST PORTION OF A MOTOR VEHICLE SEAT

(71) Applicant: TESCA France, Paris (FR)

(72) Inventors: Santiago Sanchez, Paris (FR); Llius Puig, Paris (FR); Laurent Georges, Paris (FR)

(73) Assignee: TESCA France, Paris (FR)

( * ) Notice: Subject to any disclaimer, the term of this patent is extended or adjusted under 35 U.S.C. 154(b) by 0 days.

(21) Appl. No.: 16/346,627

(22) PCT Filed: Nov. 5, 2017

(86) PCT No.: PCT/FR2017/053020
§ 371 (c)(1),
(2) Date: May 1, 2019

(87) PCT Pub. No.: WO2018/083427
PCT Pub. Date: May 11, 2018

(65) Prior Publication Data
US 2020/0062151 A1    Feb. 27, 2020

(30) Foreign Application Priority Data
Nov. 4, 2016 (FR) .................................. 16 60698

(51) Int. Cl.
*B60N 2/56* (2006.01)

(52) U.S. Cl.
CPC .................. *B60N 2/5685* (2013.01)

(58) Field of Classification Search
CPC ...... B60N 2/5685; B60N 2/5678; H05B 3/36; H05B 2203/013
(Continued)

(56) References Cited

U.S. PATENT DOCUMENTS

| 6,193,365 B1 * | 2/2001 | Ikezaki | B41J 2/17513 |
| | | | 219/543 |
| 2004/0036325 A1 * | 2/2004 | Diemer | H05B 3/34 |
| | | | 297/180.12 |

(Continued)

FOREIGN PATENT DOCUMENTS

| EP | 2532543 A1 | 12/2012 |
| EP | 2829434 A1 | 1/2015 |

OTHER PUBLICATIONS

International Search Report issued in corresponding application No. PCT/FR2017/053020, dated Mar. 8, 2018.

*Primary Examiner* — Milton Nelson, Jr.
(74) *Attorney, Agent, or Firm* — Murtha Cullina LLP

(57) ABSTRACT

The invention concerns a cushioning for seating or a backrest of a motor vehicle seat having a heating layer with an electric circuit made from conductive ink. The circuit has two buses extending longitudinally, the buses are connected together by a plurality of printed microcircuits shaped so as to form resistances capable of heating the cushioning. The cushioning also includes buses made from a first ink and microcircuits made from a second ink, the first ink having a higher intrinsic conductivity than that of the second ink, or the bus and microcircuits are made from the same ink, the ink being deposited more thickly for the buses than for the microcircuits, such that the buses provide minimized electrical resistance to the flow of current.

10 Claims, 1 Drawing Sheet

(58) Field of Classification Search
USPC .................................................. 297/180.12
See application file for complete search history.

(56) References Cited

U.S. PATENT DOCUMENTS

| | | |
|---|---|---|
| 2011/0226751 A1 | 9/2011 | Lazanja et al. |
| 2014/0246415 A1 | 9/2014 | Wittkowski |
| 2016/0016495 A1* | 1/2016 | Tuskes ................. B60N 2/5685 297/180.12 |
| 2016/0183359 A1 | 6/2016 | Sminia et al. |

* cited by examiner

CUSHIONING FOR A SEATING OR BACKREST PORTION OF A MOTOR VEHICLE SEAT

CROSS-REFERENCE TO RELATED APPLICATION

This application claims the benefit of International application number PCT/FR2017/053020, filed Nov. 5, 2017 and French application number 1660698, filed Nov. 4, 2016 the entire contents of which are incorporated herein by reference.

TECHNICAL FIELD

The invention concerns a cushioning for a seating or backrest portion of a motor vehicle seat and a seat comprising such a cushioning.

BACKGROUND

It is known to produce a cushioning for a seating or backrest portion of a motor vehicle seat, the cushioning comprising:
an elastically compressible material-based padded block,
a cap for covering the block,
a heating layer being inserted between the block and the cap, the layer comprising an electric circuit made from conductive ink, said ink being based on a polymer binder wherein are dispersed conductive particles, said ink being printed on a support,
the cushioning having the following features:
the circuit comprises at least one first and at least one second bus extending longitudinally,
the first bus is provided with a first connection point intended to be connected to a first pole of an electrical generator and the second bus is provided with a second connection point intended to be connected to a second pole of the generator, the connection points being located along an edge of the cushioning,
the buses are connected together by a plurality of printed microcircuits shaped so as to form resistances capable of heating the cushioning by flow of an electrical current.

The production of an electric circuit made from printed conductive ink, in comparison to productions bringing into play metal cables, has the interest of making it possible for a great freedom in the geometric definition of the circuit.

In particular, zones with no circuit can easily be provided, in order to make it possible for the passage of anchoring members—for example, in the shape of hooks—of the cap secured to the padded block—the hooks being anchored for example on a metal wire overmoulded by the block in the underside thereof.

However, by the constitution thereof, such an ink is less conductive, with an iso-section, than a metal cable which has a marginal resistance.

Consequently, the resistance opposite the current flowing into a bus is increased notably, as the connection point thereof is moved away.

This results in a flow into the microcircuits of a decreasing current intensity as the microcircuits are moved away from the connection points, which is conveyed by a corresponding decrease in heat.

Consequently, the cushioning is less heated as it is moved away from the connection points.

SUMMARY OF THE INVENTION

The invention aims to overcome this disadvantage.

To this end, and according to a first aspect, the invention proposes a cushioning for a seating or backrest portion of a motor vehicle seat, the cushioning comprising:
an elastically compressible material-based padded block,
a cap for covering the block,
a heating layer being inserted between the block and the cap, the layer comprising an electric circuit made from conductive ink, the ink being based on a polymer binder wherein are dispersed conductive particles, the ink being printed on a support,
the cushioning having the following features:
the circuit comprises at least one first and at least one second bus extending longitudinally,
the first bus is provided with a first connection point intended to be connected to a first pole of an electrical generator and the second bus is provided with a second connection point intended to be connected to a second pole of the generator, the connection points being located along an edge of the cushioning,
the buses are connected together by a plurality of printed microcircuits shaped so as to form resistances capable of heating the cushioning by flow of an electrical current,
the cushioning furthermore having, as required, either one of the following features:
the buses are made from a first ink and the microcircuits are made from a second ink, the first ink having a higher intrinsic conductivity than that of the second ink,
or indeed the buses and microcircuits are made from one same ink, the ink being deposited more thickly for the buses than for the microcircuits, such that the buses provide minimised electrical resistance to the flow of current.

In this description, the terms of positioning in space (longitudinal, transversal, lateral, horizontal, lower, etc.) are taken in reference to a cushioning for a seating arranged in the position of use in the vehicle and a cushioning for a backrest lowered to the horizontal, about a rotation axis extending into the lower edge of the backrest when it is the position of use.

With the arrangement proposed, the electrical resistance of the buses is minimised, which makes it possible for a substantially homogenous supplying of different microcircuits, whatever the extension thereof from the connection points.

This results in a substantially uniform heating of the cushioning on the face thereof for receiving a passenger.

According to a second aspect, the invention proposes a seat comprising such a cushioning.

BRIEF DESCRIPTION OF THE DRAWING

Other particularities and advantages of the invention will appear in the following description, made in reference to the appended figures, wherein.

DETAILED DESCRIPTION

Figure 1:
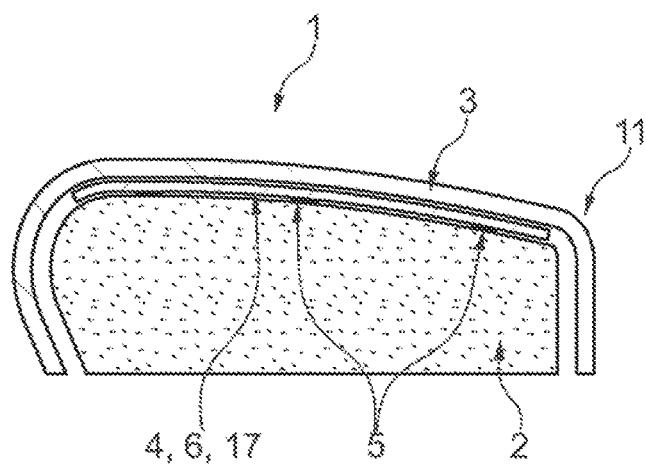
FIG. 1 is a schematic cross-sectional representation of a cushioning according to one embodiment.
Figure 2:
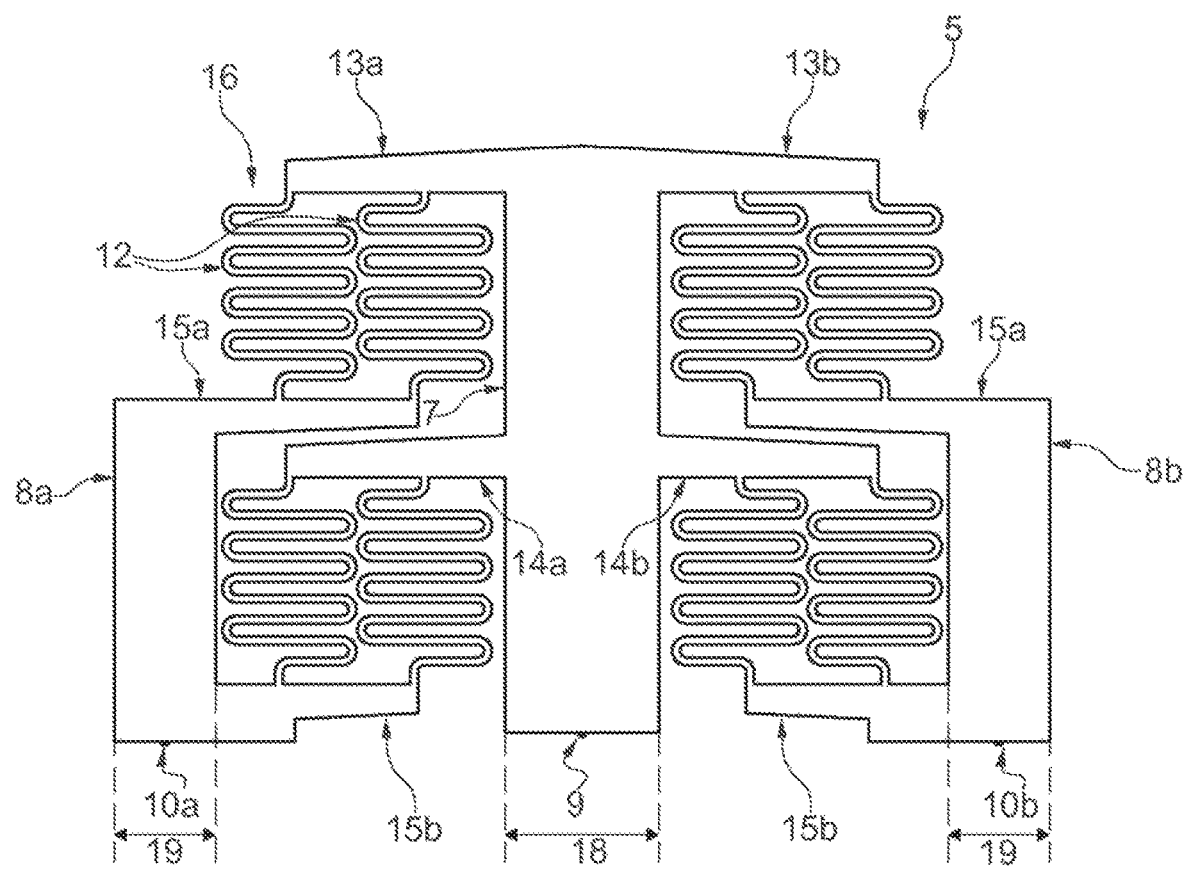
FIG. 2 is a schematic representation seen from the front of a circuit according to one embodiment.

In reference to the figures, a cushioning 1 for a seating or backrest portion of a motor vehicle seat is described, the cushioning comprising:
an elastically compressible material-based padded block 2,
a cap 3 for covering the block, a heating layer 4 being inserted between the block and the cap, the layer comprising an electric circuit 5 made from conductive ink, the ink being based on a polymer binder wherein are dispersed conductive particles,—for example made of metal—, the ink being printed on a support 6, the cushioning having the following features:

the circuit comprises at least one first 7 and at least one second 8a, 8b bus extending longitudinally, the first bus is provided with a first connection point 9 intended to be connected to a first pole of an electrical generator and the second bus is provided with a second connection point 10a, 10b intended to be connected to a second pole of the generator, the connection points being located along an edge 11 of the cushioning, the buses are connected together by a plurality of printed microcircuits 12 shaped—into twists according to the embodiment represented—so as to form resistances capable of heating the cushioning by flow of an electrical current, the cushioning furthermore having, as required, either one of the following features:

the buses are made from a first ink and the microcircuits are made from a second ink, the first ink having a higher intrinsic conductivity than that of the second ink, or indeed the buses and microcircuits are made from one same ink, the ink being deposited more thickly for the buses than for the microcircuits, such that the buses provide minimised electrical resistance to the flow of current.

The obtaining of a better conductivity for the first ink than for the second one can be made in various ways, for example by taking conductive particles with better conductivity, by increasing the ratio thereof, etc.

According to the embodiment represented, the cushioning 1 comprises:

a first single bus 7 located in the central portion of the cushioning, such that the bus forms a central bus 7, two second buses 8a, 8b arranged laterally and symmetrically on either side of the central bus, such that the second buses form lateral buses 8a, 8b, each of the lateral buses being provided with a second connection point 10a, 10b.

In a variant not represented, it can be provided that the first bus 7 comprises a median slot so as to be presented in the form of two parallel sub-buses, the slot making it possible for the passage of members for anchoring the cap 3 secured to the block 2.

In a variant not represented, a first 7 and a second 8a bus can be provided, arranged laterally on either side of the cushioning 1, the microcircuits 12 extending transversally between the buses.

Such an embodiment makes it possible to preserve the central portion of the cushioning 1 from the presence of a bus 7 which could prevent the implementation of means for securing the cap 3 on the block 2.

According to the embodiment represented, the buses 7, 8a, 8b are presented generally in the front view in the form of strips with a constant width, the width 18 of the central bus 7 being substantially the double of the one 19 of the lateral buses 8a, 8b.

Thus, at the ink iso-thickness for the first 7 and second 8a, 8b buses, a fluid flow of the current is ensured from one terminal to the other of the generator, without any "bottleneck".

According to the embodiment represented, the width 18 of the central bus 7 is between 1.8 and 2.2 times the width 19 of the lateral buses 8a, 8b.

According to the embodiment represented, the microcircuits 12 are placed on tracks arranged symmetrically with respect to the central bus 7, so as to make it possible for a symmetrical heating of the cushioning 1.

According to the embodiment represented:

the central bus 7 is provided with at least one first and one second pair of transversal branches 13a, 13b, 14a, 14b sloping along the length of the bus, two branches of a given pair pointing respectively towards either of the lateral buses 8a, 8b, the lateral buses are each provided with transversal reciprocal branches 15a, 15b pointing towards the central bus, each of the reciprocal branches being connected to a respective branch 13a, 13b, 14a, 14b of the central bus by a plurality of microcircuits 12, the plurality forming a heating sub-circuit 16.

According to the embodiment represented, the branches 13a, 13b, 14a, 14b and reciprocal branches 15a, 15b have a width being reduced as it is directed towards the free end thereof.

According to one embodiment, the width of the microcircuits 12 of a heating sub-circuit 16 increases as the sub-circuit is moved away from the connection points 9, 10a, 10b.

Such an arrangement makes it possible to compensate for a slight decrease in the intensity of the current in the microcircuits 12 as they are moved away from the connection points 9, 10a, 10b, which results from the fact that the buses 7, 8a, 8b are not perfectly conductive.

According to various embodiments, the support 6 receiving the printed electrical circuit 5 is formed, as required, by:

a flexible layer 17 inserted between the cap 3 and the block 2, according to the embodiment represented, or the face of the block intended to receive an occupant of the seat, according to an embodiment not represented, or the underside of the cap, according to an embodiment not represented.

According to the embodiment represented, the support 6 receiving the printed electrical circuit 5 being formed by a flexible layer 17 inserted between the cap 3 and the block 2, the circuit 5 is turned towards the block, such that it is protected optimally.

Finally, it is described, in a way not represented, a motor vehicle seat comprising such a cushioning 1, the cushioning being mounted secured to a frame of the seat, the connection points 9, 10a, 10b being located at the edge 11 of the cushioning, the edge being arranged in the junction zone between the seating and the backrest.

Such an arrangement makes it possible to guarantee a great robustness of the connection points 9, 10a, 10b which are not mechanically urged by a passenger bearing against the cushioning 1.

What is claimed is:

1. A cushioning for a seating or backrest portion of a motor vehicle seat, the cushioning comprising:

an elastically compressible material-based padded block, a cap for covering the block, a heating layer being inserted between the block and the cap, the layer comprising an electric circuit made from conductive ink, the ink being based on a polymer binder wherein are dispersed conductive particles, the ink being printed on a support, the cushioning having the following features:

the circuit comprises at least one first and at least one second bus extending longitudinally, the first bus is provided with a first connection point intended to be connected to a first pole of an electrical generator and the second bus is provided with a second connection point intended to be connected to a second pole of the generator, the connection points being located along an edge of the cushioning, the buses are connected together by a plurality of printed microcircuits shaped to form resistances capable of heating the cushioning by flow of an electrical current, the cushioning wherein it furthermore has, as required, either one of the following features:

the buses are made from a first ink and the microcircuits are made from a second ink, the first ink having a higher intrinsic conductivity than that of the second ink, or the buses and microcircuits are made from one same ink, the ink being deposited more thickly for the buses than for the microcircuits, such that the buses provide minimised electrical resistance to the flow of current.

2. The cushioning according to claim 1, wherein the cushioning comprises:

a first single bus located in a central portion of the cushioning, such that the bus forms a central bus, two second buses arranged laterally and symmetrically on either side of the central bus, such that the second buses form lateral buses, each of the lateral buses being provided with a second connection point.

3. The cushioning according to claim 2, wherein the buses are presented generally in the front view in the form of a strip with a constant width, the width of the central bus being substantially double the width of one of the lateral buses.

4. The cushioning according to claim 3, wherein the width of the central bus is between 1.8 and 2.2 times the width of the lateral buses.

5. The cushioning according to claim 2, wherein the microcircuits are placed on tracks arranged symmetrically with respect to the central bus.

6. The cushioning according to claim 2, wherein:

the central bus is provided with at least one first and one second pair of transversal branches sloping along the length of the bus, two branches of a given pair pointing respectively towards either of the lateral buses, the lateral buses are each provided with transversal reciprocal branches pointing towards the central bus, each of the reciprocal branches being connected to a respective branch of the central bus by a plurality of microcircuits, the plurality forming a heating sub-circuit.

7. The cushioning according to claim 6, wherein the branches and reciprocal branches have a width reducing as the width is directed towards a free end of the cushioning.

8. The cushioning according to claim 1, wherein a width of a microcircuit of a heating sub-circuit increases as the sub-circuit is moved away from the connection points.

9. The cushioning according to claim 1, wherein the support receiving the printed electrical circuit is formed, as required, by:

a flexible layer inserted between the cap and the block, or a face of the block intended to receive an occupant of the seat, or an underside of the cap.

10. A motor vehicle seat comprising a cushioning according to claim 1, the cushioning being mounted secured to a frame of the seat, the connection points being located at the edge of the cushioning, the edge being arranged in a junction zone between the seating and a backrest.

* * * * *